United States Patent
Teasdale et al.

(10) Patent No.: US 6,227,452 B1
(45) Date of Patent: May 8, 2001

(54) COMBINED ASSEMBLY FOR A POWER STEERING PUMP AND A VISCOUS HEATER

(75) Inventors: Todd R. Teasdale, Westland; Guy R. Desrochers, Bloomfield Hills; Cornel Ivanescu, Dearborn Heights, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/494,410

(22) Filed: Jan. 29, 2000

(51) Int. Cl.$^7$ ........................................................ B60H 1/02
(52) U.S. Cl. ........................ 237/12.3 R; 122/26; 126/247
(58) Field of Search .................... 237/12.3 R, 12.3 B; 122/26; 126/247; 123/142.5 R

(56) References Cited

U.S. PATENT DOCUMENTS

| | | |
|---|---|---|
| 3,349,714 | 10/1967 | Grenier . |
| 3,403,630 | 10/1968 | Clark et al. . |
| 3,632,232 | 1/1972 | Tomita et al. . |
| 3,656,870 | 4/1972 | Kusakabe et al. . |
| 4,047,846 | 9/1977 | Komamura et al. . |
| 4,715,800 | 12/1987 | Nishizawa et al. . |
| 5,333,679 | 8/1994 | Suzuki et al. . |
| 5,704,320 | 1/1998 | Ban et al. . |
| 5,743,467 * | 4/1998 | Ban et al. ............... 237/12.3 R |
| 5,775,583 | 7/1998 | Braatz et al. . |
| 5,778,843 | 7/1998 | Inoue et al. . |
| 5,791,558 | 8/1998 | Hoshino et al. . |
| 5,810,568 | 9/1998 | Whitefield et al. . |
| 5,842,635 | 12/1998 | Okabe et al. . |
| 5,871,149 | 2/1999 | Moroi et al. . |
| 5,875,740 | 3/1999 | Ban et al. . |
| 5,875,741 | 3/1999 | Moroi et al. . |
| 5,875,742 | 3/1999 | Moroi et al. . |
| 5,887,582 | 3/1999 | Ban et al. . |
| 5,896,832 | 4/1999 | Aoki et al. . |
| 5,897,056 | 4/1999 | Morikawa et al. . |
| 5,899,173 | 5/1999 | Okabe et al. . |

* cited by examiner

*Primary Examiner*—Harold Joyce
*Assistant Examiner*—Derek S. Boles
(74) *Attorney, Agent, or Firm*—Marc Lorelli

(57) ABSTRACT

An auxiliary heat source for a vehicle having a driving source is provided. The auxiliary heat source includes a drive mechanism, an auxiliary machine and a heat generating unit. The drive mechanism is adapted for receiving a rotational driving force from the driving source and includes a first drive structure and a second drive structure. The auxiliary machine for the vehicle includes a first shaft, which is coupled for rotation with the first drive structure and which is operable for providing a power input to the auxiliary machine. The heat generating unit using a shearing force to generate heat. The heat generating unit includes a rotor and a second shaft. The second shaft is coupled for rotation with the second drive structure and operable for providing a power input to the rotor. The drive mechanism is configured to rotate the first shaft at a first rotational speed based on an input speed of the rotational driving force and to rotate the second shaft at second rotational speed which is selectively controllable.

21 Claims, 4 Drawing Sheets

COMBINED ASSEMBLY FOR A POWER STEERING PUMP AND A VISCOUS HEATER

BACKGROUND OF THE INVENTION

1. Technical Field

The present invention relates generally to devices for providing a vehicle with an auxiliary source of heat and more particularly to an auxiliary heating device which is packaged with another one of the vehicle accessory devices.

2. Discussion

In conventionally configured vehicles, the heating system is typically configured in a manner which extracts heat from the coolant circulated through a water-cooled engine to heat the air that is forced into the vehicle passenger compartment. Some engines, however, such as diesel and lean-burn engines, reject so little heat that it is not possible to extract a sufficient amount of heat from the engine coolant to heat the passenger compartment at a desired rate.

To overcome this problem, many vehicle manufacturers employ an auxiliary heating device, such as a conventional viscous heater. Viscous heaters generate heat by applying a shearing force against a fluid. In response to the shearing force, the fluid is heated and this heat is in turn extracted to heat the air forced into the vehicle passenger compartment. Despite the apparent success of such viscous heaters, several drawbacks have been noted.

One significant drawback concerns the ability with which these devices may be integrated into a vehicle. Frequently, the engine compartment of modern vehicles lacks sufficient space to integrate a viscous heater in a conventional manner, necessitating the use of additional idler wheels to configure the drive belt in a desired manner and/or bracket assemblies to mount the viscous pump to the engine. The use of additional idler wheels and brackets adds significant cost to the vehicle which must be passed along to the vehicle consumer.

U.S. Pat. No. 5,743,467 to Ban et al. issued Apr. 28, 1998, which is hereby incorporated by reference as if fully set forth herein, addresses this concern by coupling a viscous heater to a vehicle accessory, such as an alternator or a power steering pump. This configuration, however, presents several other disadvantages in that the viscous pump and vehicle accessory are continuously driven from a single input shaft. Consequently, additional torque is required from the vehicle starter or starters to start the vehicle engine to overcome the additional torque created as a result of the shearing force applied by the viscous heater. Another disadvantage of this configuration is that the viscous heater is run continuously, even when auxiliary heat is not required. Operation of the viscous heater in this manner reduces the fuel economy of the vehicle.

Consequently, there remains a need in the art for an auxiliary heating device which may be easily integrated into a vehicle and controlled in a manner so as to minimize its effect on the fuel economy of the vehicle.

SUMMARY OF THE INVENTION

It is one object of the present invention to provide an auxiliary heater which may be easily integrated into a vehicle.

It is another object of the present invention to provide an auxiliary heater which may be controlled in a manner so as to minimize its effect on the fuel economy of a vehicle.

It is a further object of the present invention to provide an auxiliary heater which may be controlled to aid in heating a vehicle engine to a predetermined temperature.

An auxiliary heat source for a vehicle having a driving source is provided. The auxiliary heat source includes a drive mechanism, an auxiliary machine and a heat generating unit. The drive mechanism is adapted for receiving a rotational driving force from the driving source and includes a first drive structure and a second drive structure. The auxiliary machine for the vehicle includes a first shaft, which is coupled for rotation with the first drive structure and which is operable for providing a power input to the auxiliary machine. The heat generating unit uses a shearing force to generate heat. The heat generating unit includes a rotor and a second shaft. The second shaft is coupled for rotation with the second drive structure and operable for providing a power input to the rotor. The drive mechanism is configured to rotate the first shaft at a first rotational speed based on an input speed of the rotational driving force and to rotate the second shaft at second rotational speed which is selectively controllable.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
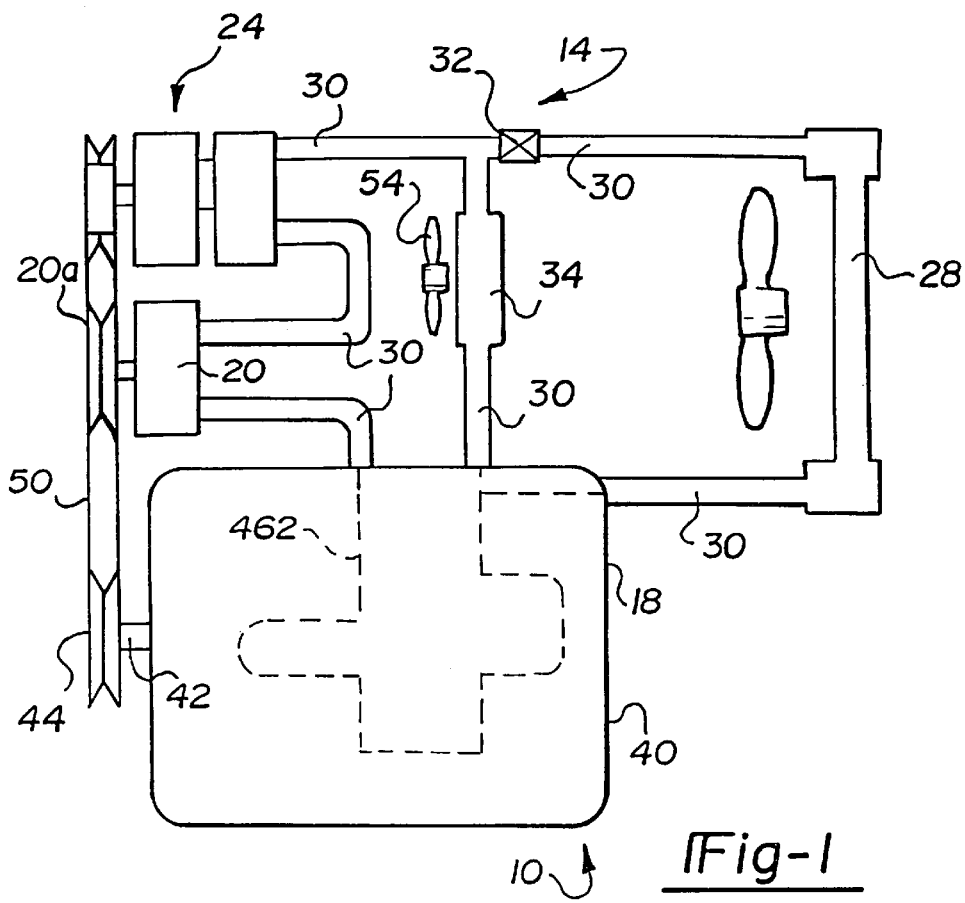
FIG. 1 is a schematic diagram of a vehicle incorporating an auxiliary heat source constructed in accordance with the teachings of the present invention.
Figure 2:
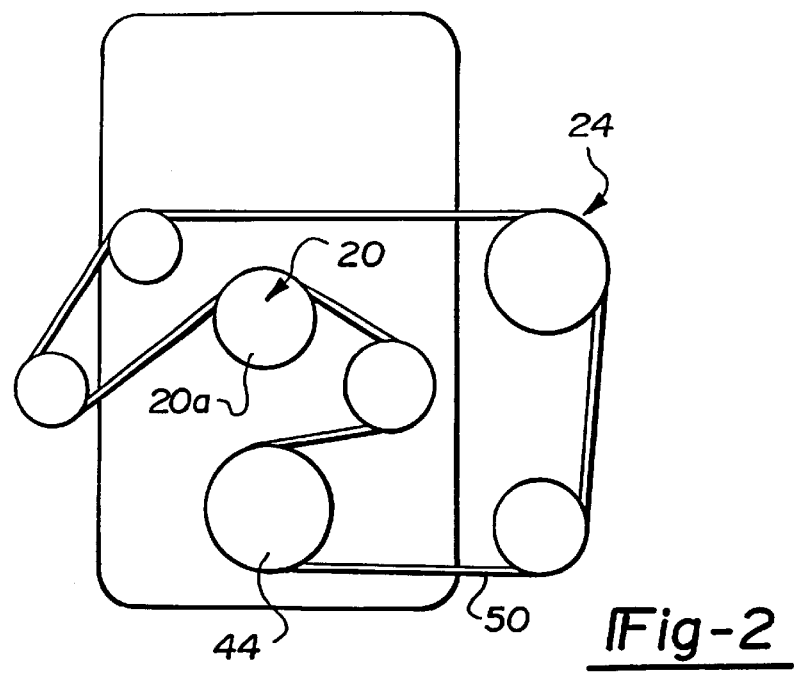
FIG. 2 is a schematic diagram of the vehicle of FIG. 1 showing the rotational drive source.

With reference to FIGS. 1 and 2 of the drawings, a vehicle constructed in accordance with the teachings of the present invention is generally indicated by reference numeral 10. Vehicle 10 is shown to include a heating system 14. Heating system 14 includes an engine housing 18, a water pump 20, an auxiliary heat source 24, a radiator 28, a liquid conduit 30, a thermostat 32, and a heater core 34. Engine housing 18 forms a portion of an engine 40, which in the particular embodiment illustrated, is a conventional water-cooled diesel engine disposed in an engine compartment of vehicle 10. Engine 40 also includes an output shaft 42 (crankshaft) and a driving source 44 (crankshaft pulley). A main heat receiving chamber 46 filled with a liquid heat exchanging medium is formed in engine housing 18.

A drive belt 50 is festooned around driving source 44 and various other devices, including a water pump pulley 20a to permit drive belt 50 to transmit a rotational driving force from the driving source 44 to these devices. Rotational driving force transmitted from drive belt 50 to water pump 20 causes the liquid heat exchanging medium to be circulated through main heat receiving chamber 46 and remove heat from engine 40.

To cool liquid heat exchanging medium during the operation of engine 40, a fluid conduit 30 couples water pump 20 to radiator 28. In the example provided, radiator 28 is a conventional parallel-flow heat exchanger. A thermostat 32 is also provided for selectively closing fluid conduit 30 to inhibit the flow of liquid heat exchanging medium to radiator 28 if the liquid heat exchanging medium has not achieved a predetermined fluid temperature.

Fluid conduit 30 also couples water pump 20 to heater core 34. Heater core 34 is a heat exchanger for removing heat from the liquid heat exchanging medium. Typically, air that has been heated by heater core 34 is blown by a fan 54 into the passenger compartment to cause the interior of vehicle 10 to achieve a predetermined temperature.

Figure 3:
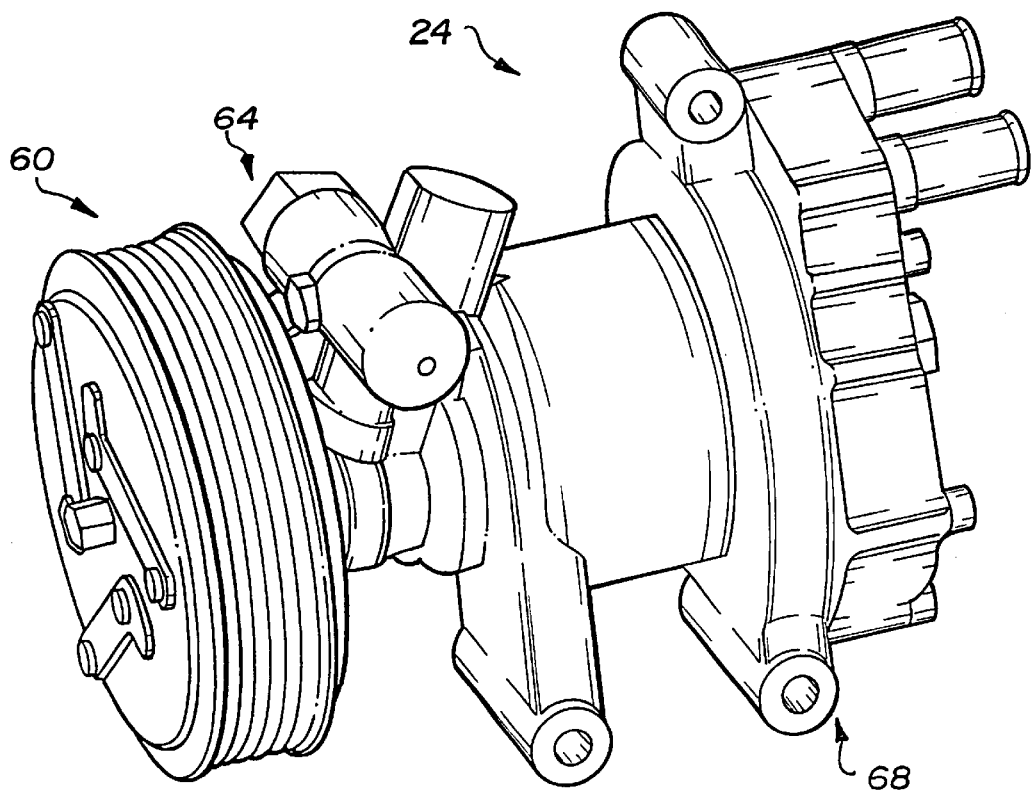
FIG. 3 is a perspective view of the auxiliary heat source of FIG. 1.
Figure 4:
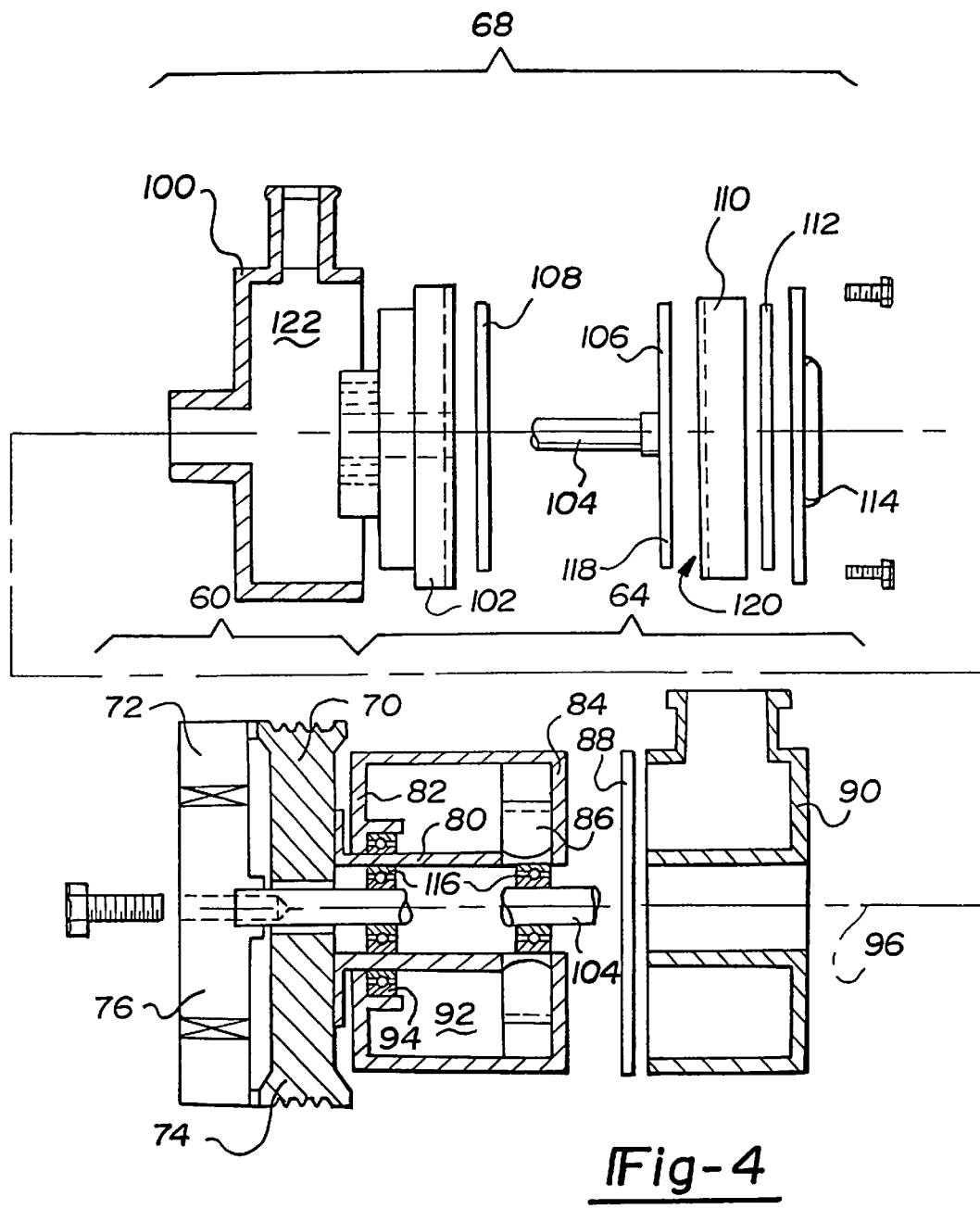
FIG. 4 is an exploded cross-sectional view of the auxiliary heat source of FIG. 3.

With reference to FIGS. 3 and 4, auxiliary heat source 24 is shown to include a drive mechanism 60, an auxiliary machine 64 and a heat generating unit 68. Drive mechanism 60 is adapted for receiving a rotational driving force from driving source 44 and includes first and second drive structures 70 and 72, respectively. In the particular embodiment illustrated, the first drive structure 70 is a pulley 74 which receives the rotational driving force as transmitted though drive belt 50 and the second drive structure 72 includes an electrically actuated magnetic clutch 76.

The auxiliary machine 64 includes a first shaft 80 coupled for rotation with the first drive structure 70. The first shaft 80 is operable for providing the auxiliary machine 64 with a first power input, wherein the first drive structure 70 rotates at a first rotational speed based on an input speed of the rotational driving force. As illustrated, auxiliary machine 64 is shown to be a power steering pump, but could be any other type of auxiliary machine including an alternator or even an automotive idler.

The power steering pump is also shown to include a pump cover 82, a pump housing 84, a vane rotor 86, a gasket 88, and a pump reservoir 90. First shaft 80 is coupled for rotation with pulley 74 and extends axially through pump cover 82 into pump housing 84. Pump cover 82 and pump housing 84 cooperate to form a pump chamber 92 which is filled with a viscous power steering fluid. A pair of radial seals (not shown) inhibit the power steering fluid from draining from pump chamber 92 in an area proximate first shaft 80. A first bearing 94 supports first shaft 80 for rotation about a shaft axis 96. Vane rotor 86 is coupled to a distal end of first shaft 80 such that vane rotor 86 and first shaft 80 are rotatably connected. Pump reservoir 90 is coupled to an end of pump housing 84 opposite pump cover 82 and is also filled with power steering fluid. Gasket 88 permits fluid communication between pump reservoir 90 and pump housing 84 in a predetermined manner.

Heat generating unit 68 is shown to include an auxiliary heater housing 100, a first heat exchanger 102, a second shaft 104, a rotor 106, a heat exchanger gasket 108, a second heat exchanger 110, an auxiliary heater housing gasket 112 and an auxiliary heater housing cover 114. Second shaft 104 is coupled for rotation with second drive structure 72 and extends axially through first shaft 80 along shaft axis into auxiliary heater housing 100. The second shaft 104 is operable for providing heat generating unit 68 with a power input which, due to electrically actuated magnetic clutch 76, may be selectively controlled to rotate in a desired manner. The rotational speed of second shaft 104 is preferably selectively controllable between a rotational speed of about zero (0) revolutions per minute and a rotational speed about equal to the rotational speed of pulley 74. More preferably, the rotational speed of second shaft 104 is selectively controllable at one or more intermediate speeds between about zero (0) revolutions per minute and a rotational speed about equal to the rotational speed of pulley 74. A pair of second bearings 116 support second shaft 104 for rotation within first shaft 80.

Rotor 106 is coupled for rotation with second shaft 104 and includes a frictional surface 118. Heat exchanger gasket 108 and first and second heat exchangers 102 and 110 cooperate to form a heat generating chamber 120 in which rotor 106 is disposed. Heat generating chamber 120 contains therein a viscous fluid. Operation of second drive structure 72 in a mode which permits rotational force to be transmitted through second shaft 104 causes rotor 106 to turn within heat generating chamber 120, causing the frictional surface 118 of rotor 106 to exert a shearing force to the viscous fluid in heat generating chamber 120. Application of the shearing force to the viscous fluid generates significant heat which is transmitted to first and second heat exchangers 102 and 110.

Auxiliary heater housing 100, auxiliary heater housing gasket 112, auxiliary heater housing cover 114 and a radial seal (not shown) cooperate to form an auxiliary heat receiving chamber 122 into which heat generating chamber 120 is disposed. A fluid conduit 30 also fluidly connects water pump 20 and heat receiving chamber 120 such that operation of water pump 20 causes the heat exchanging medium to be circulated through auxiliary heat receiving chamber 122 and remove heat from the first and second heat exchangers 102 and 110. Operation of heat generating unit 68 therefore applies heat to liquid heat exchanging medium which may be used to heat engine 40 or heater core 34.

Figure 5:
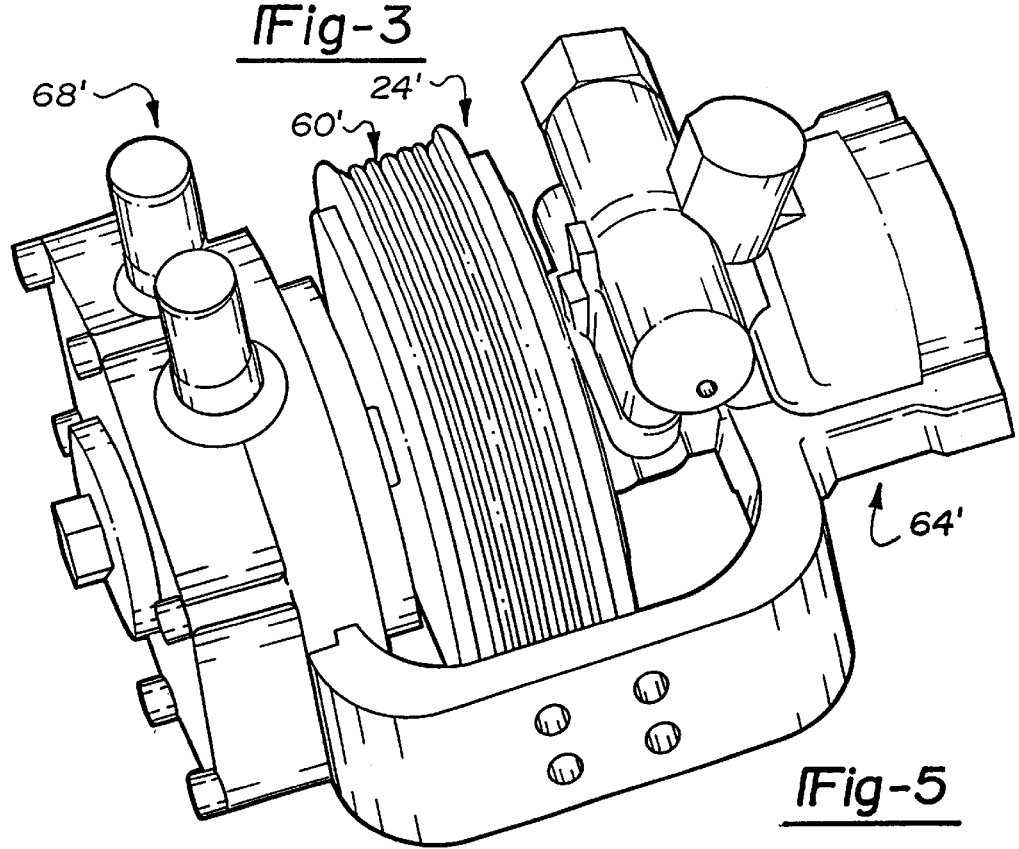
FIG. 5 is a perspective view of an auxiliary heat source according to a second preferred embodiment of the present invention.
Figure 6:
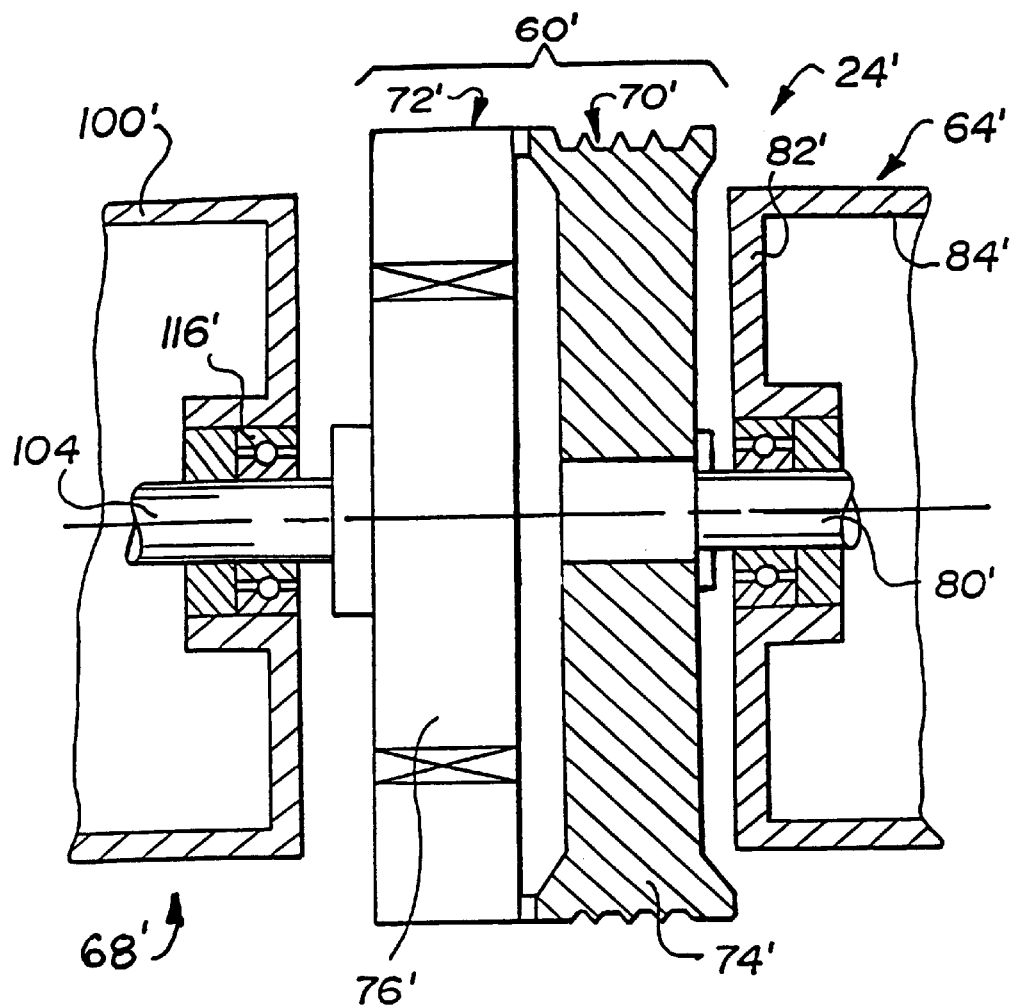
FIG. 6 is an exploded cross-sectional view of the auxiliary heat source of FIG. 5.

In FIGS. 5 and 6, an auxiliary heat source constructed in accordance with the teachings of a second preferred embodiment of the present invention is generally indicated by reference numeral 24'. Auxiliary heat source 24' is substantially similar to auxiliary heat source 24, except that the auxiliary machine 64' and the heat generating unit 68' are placed on opposite sides of the drive mechanism 60'. In this particular embodiment, first and second shafts 80' and 104' are axially spaced apart along shaft axis 96'.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An auxiliary heat source for a vehicle having a driving source, the auxiliary heat source comprising:

a drive mechanism adapted for receiving a rotational driving force from the driving source, the drive mechanism including a first drive structure and a second drive structure;

an auxiliary machine for the vehicle including a first shaft coupled for rotation with the first drive structure, the first shaft being disposed along a first axis and operable for providing a power input to the auxiliary machine; and a heat generating unit using a shearing force, the heat generating unit having a rotor and a second shaft, the second shaft coupled for rotation with the second drive structure, the second shaft being disposed along a second axis coincident with the first axis and operable for providing a power input to the rotor;

wherein the first shaft rotates at a first rotational speed based on an input speed of the rotational driving force and the second shaft rotates at second rotational speed which is selectively controllable.

2. The auxiliary heat source for a vehicle of claim 1, wherein the second drive structure is selectably controllable in a first state which causes the second shaft to have a rotational speed equal to about zero (0) revolutions per minute and a second state causing the second shaft to have a rotational speed about equal to the first rotational speed.

3. The auxiliary heat source for a vehicle of claim 2, wherein the second drive structure is further controllable in a third state having a rotational speed intermediate the rotational speeds of the first and second states.

4. The auxiliary heat source for a vehicle of claim 1, wherein the auxiliary machine is selected from the group consisting of an automotive idler, a power steering pump and an alternator.

5. The auxiliary heat source for a vehicle of claim 1, wherein the second drive structure includes an electrically actuated magnetic clutch.

6. The auxiliary heat source for a vehicle of claim 1, wherein a portion of the second shaft is supported for rotation within the first shaft.

7. The auxiliary heat source for a vehicle of claim 1, wherein the second shaft is parallel to and axially offset from the first shaft.

8. The auxiliary heat source for a vehicle of claim 1, wherein the heat generating unit and the auxiliary machine are adjacent one another.

9. A vehicle heating system to be used in combination with an engine having a driving source, the vehicle heating system comprising:

an engine housing having a main heat receiving chamber formed therein;

a radiator for the engine;

a fluid conduit for permitting a heat exchanging liquid medium to flow through the engine housing and the radiator, the fluid conduit fluidly connecting the main heat receiving chamber of the engine housing to the radiator;

a thermostat provided in the liquid conduit to control opening and closing of the liquid conduit;

a heater core for receiving heat from the liquid medium during circulation of the liquid medium through the fluid conduit; and an auxiliary heat source including a drive mechanism, an auxiliary machine for a vehicle and a heat generating unit, the drive mechanism adapted for receiving a rotational driving force from the driving source, the drive mechanism including a first drive structure and a second drive structure, the auxiliary machine including a first shaft coupled for rotation with the first drive structure, the first shaft being disposed along a first axis and operable for providing the auxiliary machine with a power input, the heat generating unit using a shearing force, the heat generating unit having a rotor, a second shaft, a heat generating chamber containing therein an amount of viscous fluid, and an auxiliary heat receiving chamber receiving heat from the heat generating chamber and permitting the heat exchanging liquid medium to flow therethrough, the rotor disposed within the heat generating chamber and rotatably coupled to the second shaft, the second shaft coupled for rotation with the second drive structure, the second shaft being disposed along a second axis coincident with the first axis and operable for providing a second power input to the rotor;

wherein the first shaft rotates at a first rotational speed based on an input speed of the rotational driving force and the second shaft rotates at second rotational speed which is selectively controllable.

10. The vehicle heating system of claim 9, wherein the second drive structure is selectably controllable in a first state which causes the second shaft to have a rotational speed equal to about zero (0) revolutions per minute and a second state causing the second shaft to have a rotational speed about equal to the first rotational speed.

11. The vehicle heating system of claim 10, wherein the second drive structure is further controllable in a third state having a rotational speed intermediate the rotational speeds of the first and second states.

12. The vehicle heating system of claim 9, wherein the auxiliary machine is selected from the group consisting of an automotive idler, a power steering pump and an alternator.

13. The vehicle heating system of claim 9, wherein the second drive structure is an electrically actuated magnetic clutch.

14. The vehicle heating system of claim 9, wherein a portion of the second shaft is supported for rotation within the first shaft.

15. The vehicle heating system of claim 9, wherein the second shaft is parallel to and axially offset from the first shaft.

16. The vehicle heating system of claim 9, wherein the heat generating unit and the auxiliary machine share a unitarily formed housing.

17. An auxiliary heat source for a vehicle having a driving source, the auxiliary heat source comprising:

a drive mechanism adapted for receiving a rotational driving force from the driving source, the drive mechanism including a first drive structure and a second drive structure, the second drive structure including an electrically actuated magnetic clutch;

an auxiliary machine for the vehicle including a first shaft coupled for rotation with the first drive structure, the first shaft being disposed along a first axis and operable for providing a first power input to the auxiliary machine, the auxiliary machine selected from the group consisting of an automotive idler, a power steering pump and an alternator; and a heat generating unit using a shearing force, the heat generating unit having a rotor and a second shaft, the second shaft coupled for rotation with the second drive structure, the second shaft being disposed along a second axis coincident with the first axis and operable for providing a second power input to the rotor;

wherein the first shaft rotates at a first rotational speed based on an input speed of the rotational driving force and the second shaft rotates at second rotational speed which is selectively controllable.

18. The auxiliary heat source for a vehicle of claim 17, wherein the second drive structure is selectably controllable in a first state which causes the second shaft to have a rotational speed equal to about zero (0) revolutions per minute and a second state causing the second shaft to have a rotational speed about equal to the first rotational speed.

19. The auxiliary heat source for a vehicle of claim 18, wherein the second drive structure is further controllable in a third state having a rotational speed intermediate the rotational speeds of the first and second states.

20. The auxiliary heat source for a vehicle of claim 17, wherein a portion of the second shaft is supported for rotation within the first shaft.

21. The auxiliary heat source for a vehicle of claim 17, wherein the second shaft is parallel to and axially offset from the first shaft.

* * * * *